United States Patent [19]

Drexler

[11] Patent Number: 4,609,812
[45] Date of Patent: Sep. 2, 1986

[54] PRERECORDED DUAL STRIP DATA STORAGE CARD

[75] Inventor: Jerome Drexler, Los Altos Hills, Calif.

[73] Assignee: Drexler Technology Corporation, Mountain View, Calif.

[21] Appl. No.: 774,576

[22] Filed: Sep. 10, 1985

Related U.S. Application Data

[63] Continuation-in-part of Ser. No. 763,027, Aug. 6, 1985, which is a continuation-in-part of Ser. No. 673,573, Nov. 21, 1984, Pat. No. 4,542,288, which is a continuation-in-part of Ser. No. 566,966, Dec. 29, 1983, Pat. No. 4,500,777, which is a continuation-in-part of Ser. No. 492,691, May 11, 1983, abandoned, which is a continuation-in-part of Ser. No. 238,833, Feb. 27, 1981, abandoned.

[51] Int. Cl.⁴ .............................. G06K 13/07
[52] U.S. Cl. .................... 235/487; 235/493
[58] Field of Search .................. 235/493, 487

[56] References Cited

U.S. PATENT DOCUMENTS

| | | | |
|---|---|---|---|
| 3,873,813 | 3/1975 | Lahr et al. | |
| 4,150,781 | 4/1979 | Silverman | 235/493 |
| 4,180,207 | 12/1979 | Lee | 235/493 |
| 4,190,843 | 2/1980 | Spong | 346/1.1 |
| 4,202,491 | 5/1980 | Suzuki | 235/491 |
| 4,209,804 | 6/1980 | Dil | 358/128.5 |
| 4,300,143 | 11/1981 | Bell et al. | 346/135.1 |
| 4,305,081 | 12/1981 | Spong | 346/135.1 |
| 4,313,188 | 1/1982 | Bartolini et al. | 369/109 |
| 4,345,261 | 8/1982 | Wilkinson | 346/76 L |
| 4,360,728 | 11/1982 | Drexler | 235/493 |
| 4,467,209 | 8/1984 | Maurer et al. | 235/487 |
| 4,493,887 | 1/1985 | Peeters et al. | 430/275 |

Primary Examiner—Harold I. Pitts

[57] ABSTRACT

A data storage card having spaced apart data strips. The card is wallet-size and preferably the strips run parallel to the lengthwise dimension of the card. One strip is made of a high capacity reflective read-only optical memory (ROOM) material. The other strip is a magnetic recording material. The high capacity ROOM strip may be made of a laser recorded material or it may be made of a material which is prerecorded using a photographic process. The two strips store complementary data in database applications.

8 Claims, 6 Drawing Figures

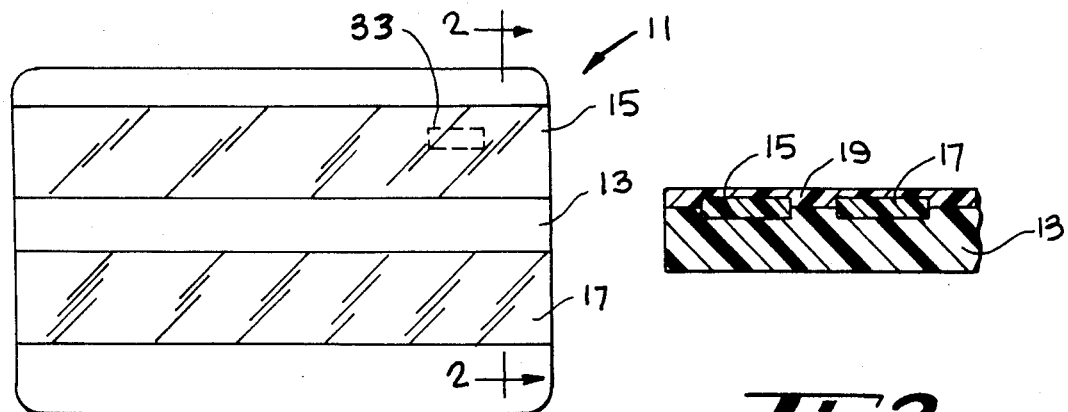
Fig.1
Fig.2
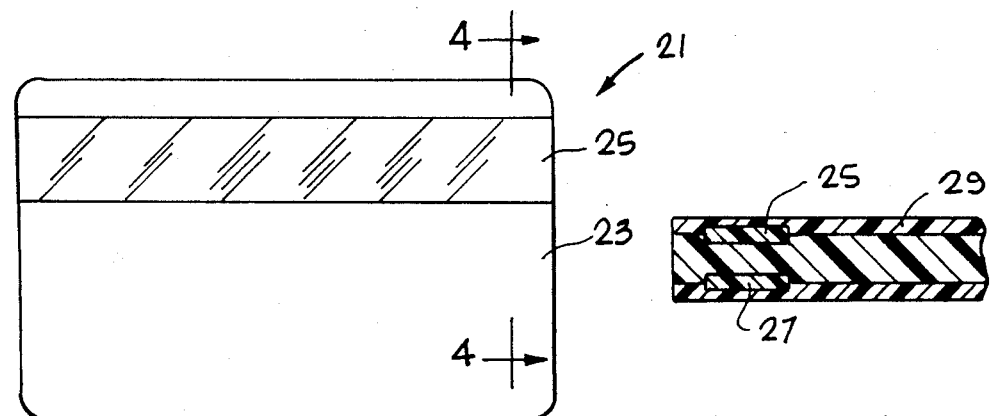
Fig.3
Fig.4
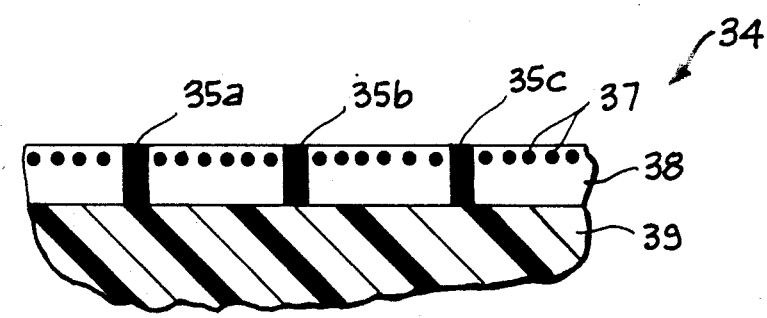
Fig.5

PRERECORDED DUAL STRIP DATA STORAGE CARD

CROSS REFERENCE TO RELATED APPLICATION

This application is a continuation-in-part of prior application Ser. No. 763,027 filed Aug. 6, 1985, which is a continuation-in-part of prior application Ser. No. 673,573, filed Nov. 21, 1984, now U.S. Pat. No. 4,542,288, which is a continuation-in-part of prior application Ser. No. 566,966, filed Dec. 29, 1983, now U.S. Pat. No. 4,500,777, which is a continuation-in-part of prior application Ser. No. 492,691, filed May 11, 1983, now abandoned, which is a continuation-in-part of prior application Ser. No. 238,833, filed Feb. 27, 1981, now abandoned.

TECHNICAL FIELD

The invention relates to data storage cards and more particularly to data storage cards which can be used to store information related to insurance, personal medical histories and the like.

BACKGROUND ART

In U.S. Pat. No. 4,360,728, Drexler describes a data card having a laser recording, direct-read-after-write (DRAW) strip, alongside a magnetic strip, the two strips working in cooperation. Maurer et al. in U.S. Pat. No. 4,467,209 discloses an identification card having erasable and non-erasable data. The erasable medium is suggested to be magnetic, while the non-erasable medium is a laser recording material or an integrated circuit. Neither of these cards is sufficient since both permit alterations or additions to be made on either strip after the cards have been produced. The ability to make alterations and additions on the magnetic strip is desirable. But it is not necessarily a desirable characteristic for the data storage strip. This capability means increased cost. It is one of the objects of the present invention to reduce costs in the production of data cards. Furthermore, there are data card uses for which it is best not to permit alterations or additions after entries into data storage.

Dil, in U.S. Pat. No. 4,209,804, teaches a reflective information recording structure which contains prepressed V-shaped grooves in which data may be recorded by local melting of the reflective metal coating by a laser. The data on the media is read by means of optical phase shift effects. Since the preformed grooves are at an optical phase depth of 95° to 140°, the reading laser must be of the precise wavelength corresponding to the groove depth. The information area has a width of approximately 0.6 microns, so a thick protective substrate, usually 1200 microns deep is used to ensure that one micron surface dust particles are out-of-focus for the read beam.

Such thick protective materials cannot be used for wallet cards which have a total thickness of only 800 microns under ISO (International Standards Organization) standards and further it would be uncomfortable to carry a rigid card in trouser pockets or wallets. Also, it is difficult to bond a phase sensitive recording/reading surface to a protective laminating material with an adhesive without introducing a varying phase shift across the surface. It is also impractical to melt large holes since a large lip would be formed around the hole causing a great distortion of the phase shift. Edge transition of the hole is the phase shift which is measured, and since the height of the lip is directly proportional to the square root of the hole diameter, phase shift reading is only practical for small holes. For example, a 25 micron diameter hole creates a lip with one micron height, which is much larger than the wavelength of the reading beam. Thus for large holes and bonded protective materials it is desirable to have a recording/reading structure that does not rely on phase shifts.

Lahr in U.S. Pat. No. 3,873,813 teaches a debit card in which use is indicated by alteration of a spot of heat sensitive coating in a selected area thereby permanently changing the reflective characteristics of that area. A reflective heat sensitive material becomes transparent on heating, thereby exposing an underlying strip of black paper which then absorbs the light energy. Recording requires exposure to a high intensity light beam for 0.7 second to raise the temperature of the material to 175° F. and an additional 5 milliseconds above 175° F. This type of credit card system permits recording of less than two data bits per second. Because of the retained, diffused liquid, the sizes of the data spots are large and difficult to regulate. This card requires a blue read beam, therefore scratches and surface dust will cause a large number of data errors unless very large data spots are used that reduce capacity to under 10,000 bits. While this data capacity is satisfactory for some debit and credit cards, it is unsuitable for detailed recording of financial, insurance, medical and personal records.

Various recording media have been developed for use on a rotating disk format. Because the disk is spinning rapidly, short laser pulse times (on the order of 500 nanoseconds) are necessary to confine the heating to small spots. The media have been developed to increase the sensitivity to the beam by varying the parameter of media absorptivity. Spong in U.S. Pat. Nos. 4,190,843 and 4,305,081 puts an absorptive dye layer over a reflective aluminum layer. Spots are recorded by ablation of the dye layer exposing the underlying reflective layer. Bell in U.S. Pat. No. 4,300,143, teaches a similar technique. Bartolini in U.S. Pat. No. 4,313,188 adds a protective layer between the dye layer and the reflective layer. Wilkinson in U.S. Pat. No. 4,345,261 uses a light absorptive silica dielectric layer in place of the dye layer. Terao teaches an inorganic absorptive layer over an organic recording film layer. Holes are formed in the film layer by heat generated in the absorptive layer. Suzuki in U.S. Pat. No. 4,202,491 uses a fluorescent ink layer on which data spots emit infrared radiation. Magneto-optical erasable laser recording materials are also known in the art. For example, see U.S. Pat. No. 4,493,887 to Peeters et al. Improved sensitivity is obtained in these media at the expense of extra layers which increase complexity and cost. This increased sensitivity is not necessary for a card format.

Bouldin et al. discloses one suitable method for photographically replicating information on the optical data storage medium of the present invention. The information is copied when actinic radiation is shown through transmissive areas of a master onto a silverhalide emulsion photosensitive medium. The medium is then developed. A laser is used to read the changes in reflectivity resulting from the process.

In the field of information storage there is sometimes a need to use two complementary databases. An object of the present invention is to devise a data card suitable for use with such databases.

DISCLOSURE OF THE INVENTION

The above objects have been met with a prerecorded read-only optical memory (ROOM) strip used in conjunction with a magnetic strip preferably parallel to the lengthwise dimension of a wallet-size card. The prerecorded ROOM strip comprises a high capacity, reflective data storage material. The strip may be made of a laser recording material or one which is photographically processed. The second strip consists of a magnetic recording material which is parallel to, but spaced apart from, the ROOM strip.

One of the advantages of the present invention is the high information capacity of the ROOM strip. By using the replication method described in U.S. Pat. No. 4,304,848, such a strip is able to contain prerecorded data spots down to ten microns or smaller in size. Large databases may be prerecorded on such an optical strip. The adjacent magnetic strip may contain other data which is either prerecorded or recorded by a user and may utilize the optically stored information for initial data, reference data or other stored data. The magnetic data is erasable, but the optically prerecorded data is not.

BRIEF DESCRIPTION OF THE DRAWINGS

FIG. 1 is a plan view of one side of a data card in accord with the present invention.

FIG. 2 is a partial side sectional view taken along lines 2—2 in FIG. 1.

FIG. 3 is a plan view of one side of an alternate embodiment of a data card in accord with the present invention.

FIG. 4 is a partial side sectional view taken along lines 4—4 in FIG. 3.

FIG. 5 is a side sectional view of a writing on a portion of the strip illustrated by dashed lines in FIG. 1.

BEST MODE FOR CARRYING OUT THE INVENTION

Figure 6:
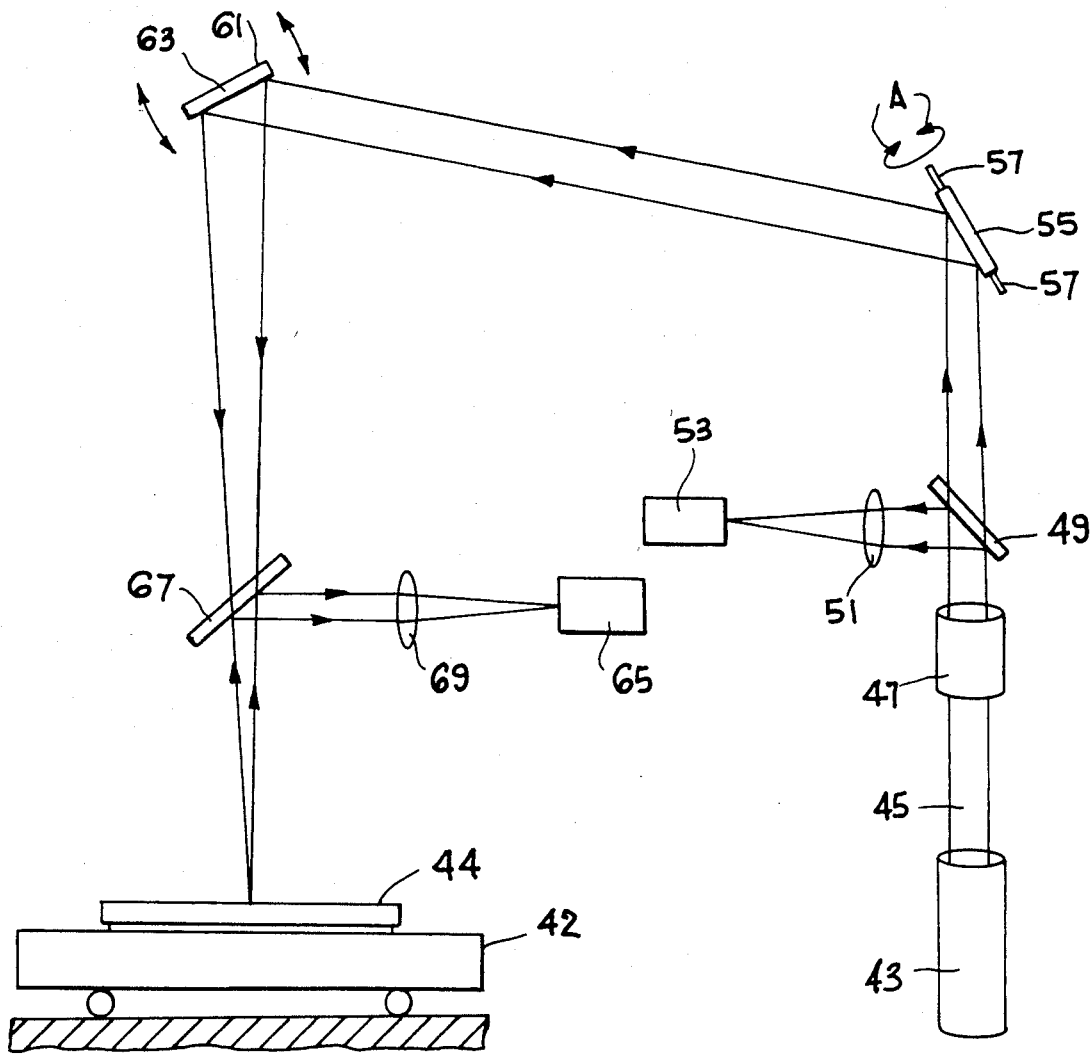
FIG. 6 is a plan view of an apparatus for reading the optical media strip illustrated in FIGS. 1 and 3.

With reference to FIGS. 1 and 2, a data storage card 11 is illustrated having a size common to most credit cards. The exact size is not critical but the card should be able to fit easily into a wallet. The card's base 13 is a dielectric, usually a plastic material such as polyvinyl chloride or similar material. The surface finish of the base should have low specular reflectivity, preferably less than 10%. Base 13 has a pair of shallow grooves which carry first and second strips 15 and 17, respectively. The strips are each about 15 millimeters wide and extend the length of the card. Alternatively, the strips may have other sizes and orientations. The strips are relatively thin, approximately 100–500 microns, although this is not critical. A read-only optical memory (ROOM) strip 15 is typically adhered to the card with an adhesive and covered by a transparent laminating sheet 19 which serves to keep strip 15 flat, as well as protecting the strip from dust and scratches. Sheet 19 is a thin, transparent plastic sheet laminating material or a coating, such as a transparent lacquer. The material is preferably made of polycarbonate plastic. An automated method for installing magnetic strips 17 is described in U.S. Pat. No. 4,231,828.

The opposite side of base 13 may have user identification indicia embossed on the surface of the card. Other indicia such as insurance policy expiration date, policy number and the like may be optionally provided.

The ROOM strip 15 is a high capacity, reflective data storage material. The capacity should be such that the strip can act as a data base holding the equivalent to scores of pages of text. The data is prerecorded onto the strip. Methods are known whereby data storage media may be prerecorded with information and then read by comparing areas of low reflectivity and areas of high reflectivity. To take advantage of the resulting cost reductions, the method which is chosen should be one which allows reproduction of data from a master. For example, Bouldin et al. in U.S. Pat. No. 4,304,848 permits reproduction of data from a master transmissive optical data storage medium.

With reference to FIG. 5, a magnified view of a read-only optical memory strip 34, taken from within dashed line 33 of FIG. 1, may be seen. The strip 34 is prerecorded with data by use of a photographic method as taught by Bouldin et al. Actinic radiation is shone through transmissive areas in a master data storage medium, not shown, onto the ROOM strip 34. The strip 34 is made up of a silver-halide emulsion 38 on a substrate 39, which is usually transparent glass or plastic. The silver-halide emulsion 38 is then chemically developed black. Next, the developed medium is fogged to create a latent image layer of silver precipitating nuclei. Finally, the fogged medium is placed in a monobath for partial chemical development and substantial physical development. The resulting product displays areas of low reflectivity, which correspond to the transmissive areas of the master. In FIG. 5 these areas of low reflectivity are represented by black areas 35a, 35b and 35c. The areas of the strip 34 which do not correspond to the transmissive areas of the master contain metallic silver, represented by the clustered dots 37. The black areas 35a, 35b and 35c of the strip 34 have reflectivities typically under 5% while the remaining areas have reflectivities typically greater than 25%. Thus, the reflective contrast ratio usually exceeds 5:1. The ratio should be at least 3:1.

With reference to FIGS. 3 and 4, a card 21 is shown, having a plastic base 23, similar to base 13 in FIG. 1. The card 21 has opposed first and second strips 25 and 27 adhered thereto with transparent laminating sheet 29 covering the base, as well as the strip 25, holding it securely in place. The card of FIGS. 3 and 4 is essentially the same as the card of FIGS. 1 and 2 except for the manner in which the two strips are arranged. On FIG. 1, the strips are on the same side of the card so that all reading transducers can be located on the same side of the card, while in FIG. 3, reading transducers must be located on opposite sides of the card.

Data is encoded onto a ROOM strip by alternating low reflectivity and high reflectivity areas along a track on the strip. Presently, in optical disk technology, tracks which are separated by only a few microns may be resolved. The spacing and pattern of the low reflectivity areas along each track are selected for easy decoding. For example, the black areas 35a, 35b and 35c of FIG. 5 can be clustered and spaced in accord with self-clocking bar codes. The spacing between tracks is not critical, except that the optics of the readback system should be able to easily distinguish between paths.

In FIG. 6, a side view of the lengthwise dimension of a card 44 is shown. The card is usually received in a movable holder 42 which brings the card into a beam trajectory. A laser light source 43, preferably a semiconductor laser of near infrared wavelength emits a beam 45 which passes through collimating and focusing optics 47. The beam is sampled by a beam splitter 49 which transmits a portion of the beam through a focusing lens 51 to a photodetector 53. The detector 53 confirms laser output and is not essential. The beam is then directed to a first servo controlled mirror 55 which is mounted for rotation along the axis 57 in the direction indicated by the arrows A. The purpose of the mirror 55 is to find the lateral edges of the ROOM strip in a coarse mode of operation and then in a fine mode of operation identify data tracks which exist predetermined distances from the edges.

From mirror 55, the beam is directed toward mirror 61. This mirror is mounted for rotation at pivot 63. The purpose of the mirror 61 is for fine control of motion of the beam along the length of the card. Coarse control of the lengthwise position of the card relative to the beam is achieved by motion of movable holder 42. The position of the holder may be established by a linear motor adjusted by a closed loop position servo system of the type used in magnetic disk drives. Reference position information may be prerecorded on the card. Upon reading one data track the mirror 55 is slightly rotated. The motor moves holder 42 lengthwise so that the next track can be read, and so on. Light scattered and reflected from the black areas 35a, 35b and 35c of FIG. 5 contrasts with the surrounding field where no prerecorded areas exist.

Differences in reflectivity between a black area and surrounding material are detected by light detector 65 which may be a photodiode. Light is focussed onto detector 65 by beam splitter 67 and focusing lens 69. Servo motors, not shown, control the positions of the mirrors and drive the mirrors in accord with instructions received from control circuits as well as from feedback devices. The detector 65 produces electrical signals corresponding to black areas. These signals are processed and recorded for subsequent display as useful information regarding the prerecorded data on the card.

FIG. 6 does not show the magnetic transducer used for reading the magnetic strip, but such transducers and the codes for magnetic strips are well known.

In operation, the data storage card of the present invention could be used to store databases. The ROOM strip can be encoded with an assemblage of information, such as an insurance policy or a library index. Then the magnetic strip may be used to hold information separate from, but related to, that data held on the ROOM strip. Or the magnetic strip may be used to temporarily store data which is also contained on the optical strip. Use of the magnetic strip is intended to complement or rely upon the optical strip or to be used to fill shortterm storage requirements.

I claim:

1. A data storage card for use with a card reader comprising,
   a wallet-size card having opposed sides and a length equal to or exceeding a width,
   a first strip of high resolution reflective read-only optical memory material adhered to the card, said first strip containing photolithographically prerecorded high and low reflectivity data areas representing data bits, the reflective contrast ratio between said high and low reflectivity data areas at least two to one, and
   a second strip of magnetic recordable material adhered to the card.

2. The card of claim 1 wherein said first and second strips are adhered to the same side of said card.

3. The card of claim 1 wherein said first and second strips are adhered to opposite sides of said card.

4. The card of claim 1 wherein said first and second strips are disposed parallel to each other and spaced apart on the same side of said card, said strips extending in the lengthwise direction.

5. A data storage and retrieval system comprising,
   a wallet-size card having opposed sides and a length equal to or exceeding a width,
   a first strip of high resolution reflective read-only optical memory material adhered to the card, said first strip containing photolithographically prerecorded high and low reflectivity data areas representing data bits, the reflective contrast ratio between said high and low reflectivity data areas at least two to one,
   a second strip of magnetic recordable material adhered to the card,
   light source means emitting a beam for illuminating data areas on said first strip and a photodetector, said light source means and said photodetector disposed in reflective data-read relation with respect to said first strip of said card, and
   a magnetic head in magnetic writing relation with respect to said second strip.

6. The card of claim 5 wherein said first and second strips are adhered to the same side of said card.

7. The card of claim 5 wherein said first and second strips are adhered to opposite sides of said card.

8. The card of claim 5 wherein said first and second strips are disposed parallel to each other and spaced apart on the same side of said card, said strips extending in the lengthwise direction.

* * * * *